Aug. 18, 1970  E. S. BEYERS  3,525,005
AXIAL AIR GAP ALTERNATORS WITH MOVABLE P-M DISC ROTOR
Filed Aug. 26, 1968

INVENTOR
EDWARD STANLEY BEYERS
BY Young + Thompson
ATTYS

# United States Patent Office 3,525,005
Patented Aug. 18, 1970

3,525,005
AXIAL AIR GAP ALTERNATORS WITH MOVABLE P-M DISC ROTOR
Edward Stanley Beyers, 199 Prince George Ave., Brakpan, Transvaal, Republic of South Africa
Filed Aug. 26, 1968, Ser. No. 755,215
Claims priority, application Republic of South Africa, Aug. 29, 1967, 5,165
Int. Cl. H02k 21/24, 35/02; H02p 9/40
U.S. Cl. 310—156                               3 Claims

ABSTRACT OF THE DISCLOSURE

An electric generator comprising a stator and a rotor, the rotor having magnets thereon and being separated from the stator by an air gap, a shaft floatably mounted in bearings in the generator casing and carrying the rotor, and vanes provided on the rotor and adapted, on rotation of the rotor, to create a thrust away from the stator proportional to the rate of rotation of the rotor.

---

This invention relates to electric generators and, in particular, to axial air gap alternators with movable P-M disc rotor.

It is an object of the invention to provide an electric generator which will maintain a substantially constant voltage over a wide range of speeds.

According to the invention, an electric generator includes a stator and a rotor, the rotor having magnets thereon and being separated from the stator by an air gap, the rotor being mounted on a shaft for longitudinal movement in relation to the stator by means responsive to the rotational speed of the shaft.

In one preferred form of the invention an electric generator includes a stator and a rotor, the rotor having magnets thereon and being sepaarted from the stator by an air gap, the rotor being mounted on a helix on the shaft through a complemental helix, movement of the rotor on the helix away from the stator being opposed by spring means.

In another preferred form of the invention an electric generator includes a stator and a rotor, the rotor having magnets thereon and being separated from the stator by an air gap, the rotor being mounted on a shaft, the shaft being floatably mounted in bearings, the rotor having vanes adapted, when the rotor is rotating, to create a thrust away from the stator proportional to the rate of rotation of the rotor.

Figure 1:
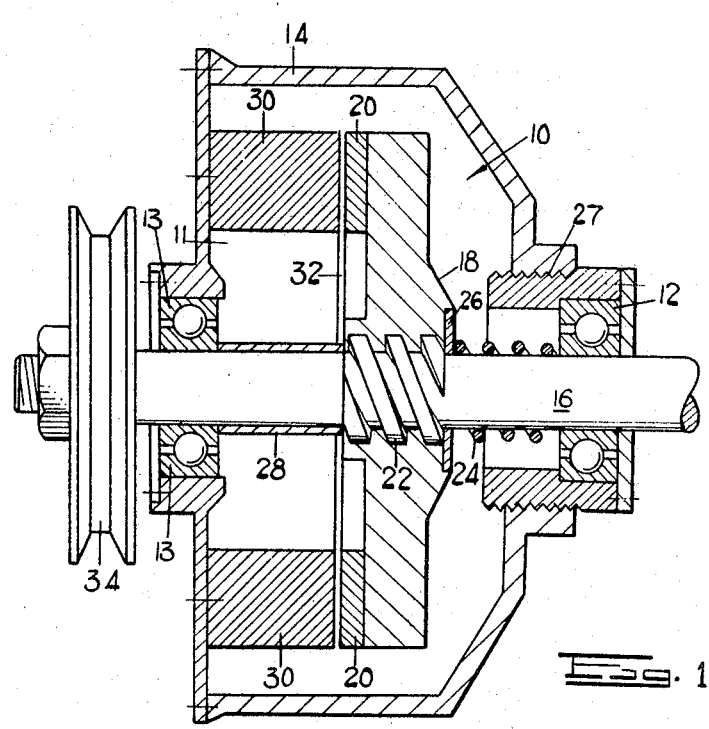
Figure 2:
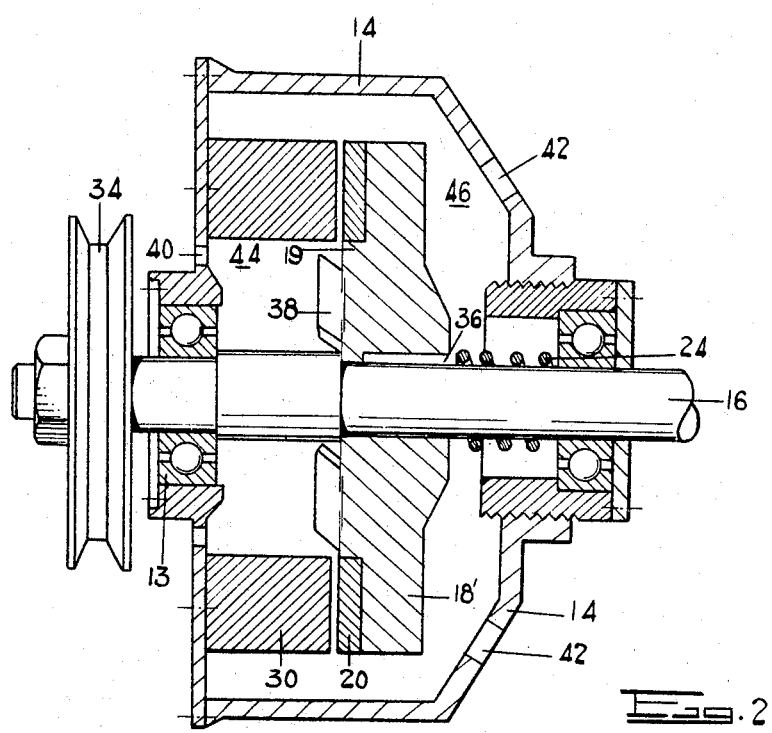

Two embodiments of the invention will now be described with reference to the accompanying drawings, in which:

FIGS. 1 and 2 are cross-sectional side views of the first and second embodiments, respectively.

Referring to FIG. 1, an electric generator comprises a rotor 10 and stator 11. Bearings 12 and 13, mounted in a casing 14, carry a shaft 16 on which is mounted the rotor 10 comprising an armature 18 which carries permanent magnets 20. The shaft 16 has a helical thread 22 which engages with a complemental internal helix on the armature. A compression spring 24 is mounted on the shaft 16 between the bearing 12 and a washer 26 which bears against the armature 18. The spring 24 biases the armature towards the stator 11 this movement being limited by a sleeve 28 situated between the armature 18 and the bearings 13. The bearing 12 is axially adjustable in the casing 14 (by means of screw threads 27), enabling the force of the spring 24 to be adjusted.

The stator 11 is fixedly attached to the casing 14, the coils thereof being indicated at 30 in the drawings. The permanent magnets 20 are separated from the coils 30 by an air gap 32. A belt-driven pulley 34 on the shaft 16 rotates the rotor 10 in an anti-clockwise direction when viewed from the left of the drawing.

By well-known principles of electricity, a voltage is induced in the coils of the stator upon rotation of the rotor 10, the voltage normally being proportional to the speed of rotation of the rotor 10. However, as the rotor 10 speeds up, the inertia of the armature 18 causes the rotor 10 to lag behind the shaft 16. This lagging of the rotor causes a screwing motion resulting in a movement of the rotor along the shaft towards the bearing 12. This movement is resisted by the spring 24. Sudden acceleration causes a relatively violent movement to the right thereby preventing a sharp increase in the voltage. When the speed levels off, the spring 24 tends to move the rotor 10 towards the stator 11. The tension of the spring 24 is so adjusted that the voltage remains substantially constant throughout the speed range of the generator.

FIG. 2 illustrates a second embodiment of the invention.

In this embodiment, the same numbers are used to denote parts similar to those of the first embodiment described above. Referring to the figure, the shaft 16 is keyed at 36 to the armature 18'. In this embodiment it will be seen that the spring 24 bears against the key 36 instead of against a washer 26 as was the case with the previous embodiment.

The armature 18' is provided with a number of inclined vanes 38 arranged around its face 19.

Ports 40 and 42 are formed in the casing 14, the ports 40 leading into an inner chamber 44 and the ports 42 leading into an outer chamber 46. The diameter of the ports 40 is smaller than the diameter of the ports 42.

In use, a voltage is induced in the coils 30 by rotation of the rotor 10. As the rotor rotates it creates a thrust which moves it away from the stator against the compressive force of spring 24. This movement is enhanced in that, as the rotor speeds up so the vanes 38 tend to increase the pressure in the chamber 44. This pressure forces the rotor and shaft towards the bearings 12, the shaft being adapted for longitudinal movement through the bearings 12 and 13—in other words, the shaft 16 is a floating shaft. As in the previous embodiment the tension of the spring 24 is so adjusted that the voltage remains substantially constant throughout the speed range of the generator.

The diameters of the ports 40 and 42 is a further feature of this embodiment. A current of air passes through the wide ports 42, past the rotor 10 and into the chamber 44, and then out through the narrow ports 40, and so act as a cooling medium for the generator. The ports 40, being of smaller diameter than the ports 42, restrict the free flow of air therethrough and hence assist in creating a pressure in the chamber 44. The diameters of the port are of predetermined diameters to ensure maximum efficiency. Alternatively, the diameters of the ports may be varied in any suitable manner.

I claim:

1. An electric generator comprising a stator and a rotor, the rotor having magnets thereon and being separated from the stator by an air gap, a shaft carrying the rotor, bearings on which the shaft is floatably mounted, and vanes on the rotor, the vanes being adapted, on rotation of the rotor, to create a thrust away from the stator proportional to the rate of rotation of the rotor.

2. An electric generator according to claim 1, and spring means behind the rotor to oppose movement of the rotor away from the stator.

3. An electric generator according to claim 1, and a casing for the generator defining an inner chamber and an outer chamber between the rotor, stator and casing, and ports in the casing for venting the chambers to the outside atmosphere, the ports leading into the inner chamber being of smaller cross-sectional area than the ports leading into the outer chamber.

References Cited

UNITED STATES PATENTS

| | | | |
|---|---|---|---|
| 1,070,437 | 8/1913 | Ferguson | 322—17 |
| 1,131,551 | 3/1915 | Price | 310—209 |
| 1,438,361 | 12/1922 | Cole | 310—209 |
| 1,822,264 | 9/1931 | Apple | 310—209 |
| 2,824,275 | 2/1958 | Kober | 322—27 |
| 3,165,656 | 1/1965 | Korthaus et al. | 310—209 X |

WARREN E. RAY, Primary Examiner

U.S. Cl. X.R.

310—191, 209, 268; 322—51